United States Patent [19]

Dach

[11] 4,200,008
[45] Apr. 29, 1980

[54] HYDRAULIC ACTUATING SYSTEM FOR A PAIR OF CONCURRENTLY OPERATING FRICTION DEVICES FOR THE SELECTION OF SPEEDS OF A LOAD-SHIFTABLE TRANSMISSION

[75] Inventor: Hansjörg Dach, Friedrichshafen, Fed. Rep. of Germany

[73] Assignee: Zahnradfabrik Friedrichshafen Aktiengesellschaft, Friedrichshafen, Fed. Rep. of Germany

[21] Appl. No.: 865,302

[22] Filed: Dec. 28, 1977

[30] Foreign Application Priority Data

Dec. 29, 1976 [DE]  Fed. Rep. of Germany ....... 2659353

[51] Int. Cl.$^2$ ............................................. F16H 3/44
[52] U.S. Cl. .......................................... 74/869; 74/867
[58] Field of Search ............ 74/687, 867, 869, 752 C, 74/753, 868

[56] References Cited

U.S. PATENT DOCUMENTS

| 3,453,908 | 7/1969 | Iijima | 74/867 |
| 3,494,223 | 2/1970 | Mori | 74/869 |
| 3,719,108 | 3/1973 | Sakai | 74/869 |
| 3,726,157 | 4/1973 | Marumo | 74/753 |
| 3,938,410 | 2/1976 | Dach et al. | 74/867 X |

*Primary Examiner*—C. J. Husar
*Assistant Examiner*—Frank McKenzie
*Attorney, Agent, or Firm*—Karl F. Ross

[57] ABSTRACT

A hydraulic control system of the type disclosed in U.S. Pat. No. 3,938,410 is improved by providing a 2–3 shift valve which connects a direct passage and a throttle-containing passage to the control valve for the second clutch or brake (second-friction device) while the pressure in the first clutch or brake (first friction device) is applied to one side of the second control valve, a restoring spring acting upon the opposite side of this second control valve. This valve establishes a threshold for the pressure in the first friction device such that the direct passage is connected to the second friction device below the threshold while the throttle-containing passage is connected to the second friction device at or above this threshold.

4 Claims, 1 Drawing Figure

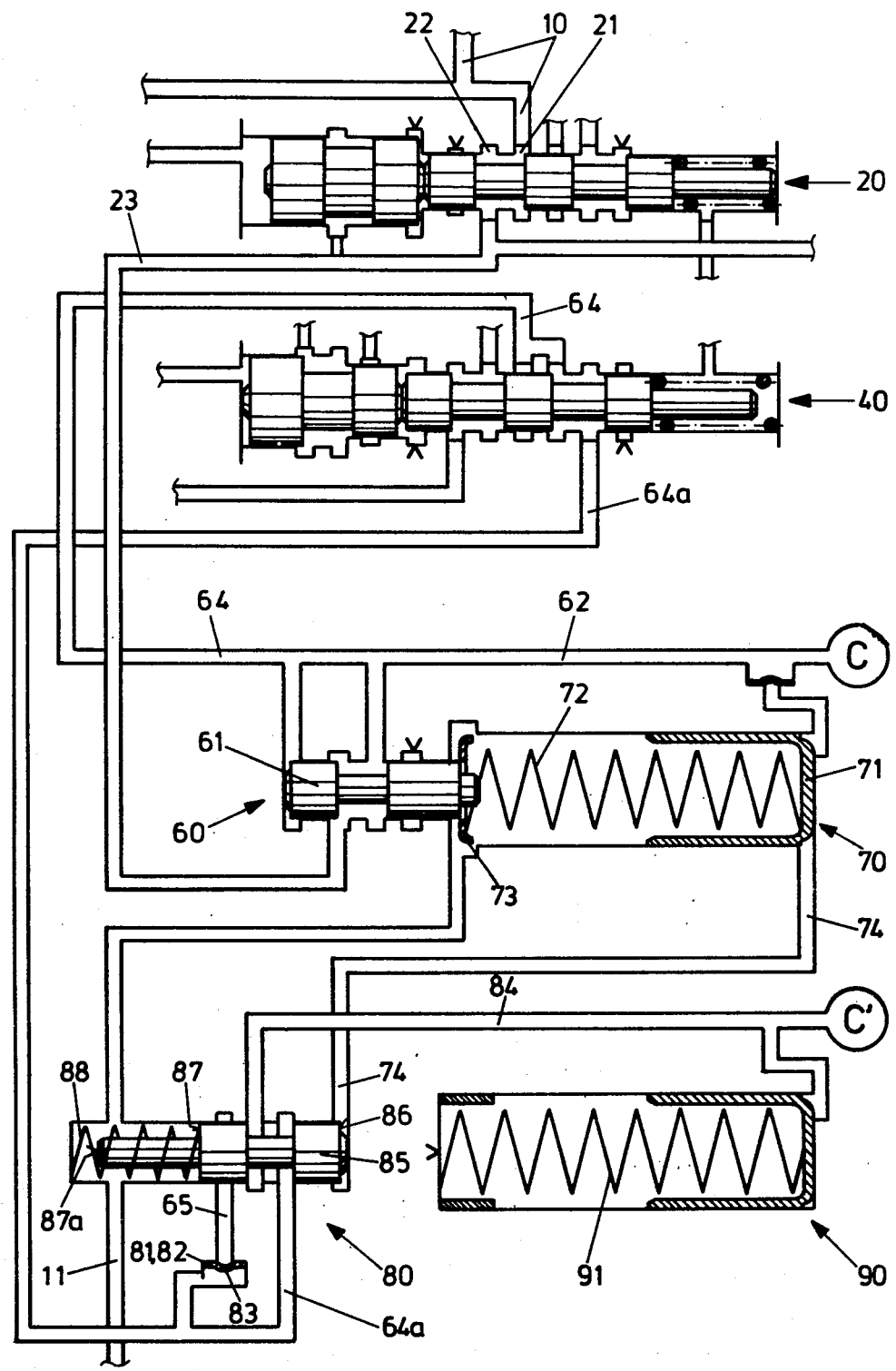

HYDRAULIC ACTUATING SYSTEM FOR A PAIR OF CONCURRENTLY OPERATING FRICTION DEVICES FOR THE SELECTION OF SPEEDS OF A LOAD-SHIFTABLE TRANSMISSION

FIELD OF THE INVENTION

The present invention relates to a hydraulic-control system for a multispeed transmission shiftable under load and, more particularly, to a hydraulic-actuating system for a pair of concurrently operating or parallel-filled clutches or brakes, hereinafter often referred to as speed-selecting friction devices. The invention is especially applicable to systems of the type described in commonly owned U.S. Pat. No. 3,938,410 which describes an improvement upon my earlier U.S. Pat. No. 3,610,070 and which also refers to my still-earlier U.S. Pat. Nos. 3,559,669 and 3,593,599. Reference may also be had to U.S. Pat. No. 3,583,422.

BACKGROUND OF THE INVENTION

A multispeed load-shiftable transmission generally comprises gearing establishing selected paths between an input shaft (which may be counted to an engine of an automotive vehicle) and an output shaft (which may be connected to a load such as the driving wheels of the vehicle). Generally speaking, and as described in the aforementioned patents, "speed" or "gear" selection is effected by selection among the several transmission ratios, by the hydraulic actuation of certain friction devices, namely, hydraulic clutches and/or brakes. These friction devices serve to couple parts of the transmission together to establish one or another gear train. For example, when the friction device is a brake, it may immobilize a free-running part of a planetary-gear speed-reducing gear train to establish one transmission ratio, or "speed" or "gear". A clutch may be used to couple a particular gear train to the input or output shaft. When friction devices of this type are used, speed selection can be effected without decoupling the output shaft from the load and hence, the transmission is said to be shiftable under load or load-shiftable.

In the latest-issued of the aforementioned patents, a hydraulic system is disclosed which effects efficient hydraulic actuation of a pair of concurrently operating clutches or brakes, i.e. hydraulic devices or friction devices of the aforedescribed type. While a detailed description of that system is not necessary for an understanding of the present improvement, since that patent and U.S. Pat. No. 3,610,070 are hereby incorporated by reference in their entirety for all subject matter relating to the transmission and hydraulic connections which have not been described, some definitions appear to be desirable.

When reference is made herein, therefore, to a 1-2 shift valve or a 2-3 shift valve, it will be understood that such reference is intended to mean a slide valve, preferably of the spool type, which is hydraulically actuated to shift the gear transmission between its first and second speeds and between its second and third speeds respectively, either for upshifting or downshifting. The actuation of these valves may be hydraulic, i.e. by pressurization of these valves from one end, against the force of respective restoring springs, by any convenient means.

When reference is made herein to a "damper" it is to be understood that such a device is intended to permit controlled increase in pressure and to prevent the generation of pressure shocks (jolts). Such a damper may be a spring-loaded pressure accumulator and, unless otherwise stated, may be any convenient pressure accumulator of conventional design.

When reference is made to "load-modulated" pressure, it is intended to refer to a hydraulic pressure which is a function of the load and hence a torque applied at the output shift. This pressure can be considered to be throttled supply pressure and hence such terminology is often used.

U.S. Pat. No. 3,610,070 describes a system in which two fluid-operated clutches or brakes, acting as drive-establishing means for a multi-speed transmission, are concurrently operated under the control of a set of valves in response to manually or automatically generated speed-selection commands.

The system specifically described in this patent comprises, as a first and a second drive-establishing means, a unidirectionally effective and a bidirectionally effective brake which are both filled with a high-pressure hydraulic fluid upon an upshift from a low-speed position (first gear) into an intermediate speed position (second gear), the engagement of both brakes being moderated by a control valve which in its normal position admits fluid to them at a relatively high rate but which, upon incipient pressure build-up in the unidirectionally effective first brake, is moved by fluid feedback into a off-normal position resulting in throttled flow.

After the pressure in the first brake (which at this stage is directly connected to the second brake) has reached a predetermined level, the normal position of the control valve is established by a force-increasing action of that fluid pressure upon a piston member opposing the off normal displacement of this valve. Thus the two brakes are under full supply pressure as soon as the upshift into the second gear is completed.

A further upshift into a high-speed position (third gear) requires the release of the bidirectionally effective second brake. This release is brought about by the draining of the feeder line of that brake via the normal position of the control valve and a 2-3 shift valve in tandem therewith.

In the event of a subsequent downshift to the intermediate high-speed position (second gear), the first brake is already actuated so that only the second brake need be supplied with fluid. This occurs in response to a return of the 2-3 shift valve from an upshifting to a downshifting position with no further intervention of the control valve in tandem therewith. If the upshift into third gear occurs before the second gear position is fully established, i.e. with the control valve still in its off-normal throttling position, the draining of the bidirectionally effective brake cannot take place immediately but must await the restoration of the control valve to normal. The resulting delay may lead to concurrent actuation of the two brakes and of a third friction device, namely, a clutch effective in third gear only whereby, with three drive-establishing means acting upon a common movable element, i.e. the output shift, the system jams for brief periods and parts thereof may be subjected to excess stress.

To avoid this disadvantage I, together with others, proposed the improvement which has been fully described in U.S. Pat. No. 3,938,410 whereby drain means is provided for the second drive-establishing means, specifically the bidirectionally effective brake, effective in the blocking position of 2-3 shift valve independently of the position of the associated control valve.

In accordance with this improved control system, the feed line for the second friction device or brake, is split into two sections, a first section extending from the control valve to a first port of another valve cylinder and a second section extending from a second port of that cylinder to the second friction device. In the unblocking position of the 2-3 shift valve, a piston in this valve cylinder interconnects the two ports; in the blocking position, it obstructs the two ports and connects the two ports to a drain.

The piston and cylinder of this improved system may form part of the 2-3 shift valve or may be directly controlled thereby through the intermediary of a discharge port which communicates with the fluid-supply channel in the blocking position of this valve and applying fluid pressure, counteracting a restoring force, to the piston of the drain valve. In the latter case, the same discharge port advantageously feeds the third friction device, namely, the aforementioned clutch.

U.S. Pat. No. 3,938,410 thus describes a hydraulic actuating system which affords an excellent shift transition using two parallel-actuated clutches with the same pressure buildup although optimum operation is not, however, obtainable therewith because the pressure buildup in the second clutch or brake takes place with a small time lag of about 0.1-0.3 seconds, although the subsequent pressure increase is completely satisfactory.

The lag results because the control edge of the valve piston 151c (see the drawing of this patent) opens only when the valve 150 is shifted into its control position and permits the unobstructed completely equal pressurization of the first and second friction devices B1F and B1 via the passages 166, 166c and 175. Further the orifice in the throttle 216a cannot be made larger since this orifice determines the quality of the downshift from third speed to second speed. The first friction device BIF, as a result of the lag of the second friction device B1 is subjected to higher thermal loading.

The valve provided in the feeder line of the second friction device operates as a drain valve to avoid detrimental overlap during speed changes and is connected with the feeder line of the further friction clutch or with the 2-3 shift valve.

OBJECT OF THE INVENTION

It is the object of this invention to provide a control system which, while retaining the good gear-shifting qualities of the system of U.S. Pat. No. 3,938,410 affords an improved pressure buildup and especially a simultaneously a completely uniform filling of the two friction devices which are to be actuated in parallel.

SUMMARY OF THE INVENTION

This object, and others which will become apparent hereinafter, are attained by connecting a first hydraulic line feeding the first friction device by the 2-3 shift valve to a direct passage and to a throttle-containing passage communicating selectively via the second control valve with a second hydraulic line feeding the second friction device.

The second control valve has a slider to one end surface of which is applied the pressure of the first friction device while an opposingly effective surface is biased against the pressure of the first friction device by a restoring spring so that, at a pressure in the first friction device below a threshold valve, this slider of the second control valve connects the direct passage to the second hydraulic line and the throttle-containing passage is blocked.

The slider of the second control valve blocks the direct passage and connects the throttle-containing passage to the second hydraulic line upon the pressure in the first friction device attaining a threshold value substantially simultaneously with an abutment of the piston of the damper for the first control valve against the slider of the first control valve.

Advantageously, the spring acts in conjunction with a throttled pressure which is load-modulated in the sense mentioned previously.

The control arrangement of the present invention thus makes possible the pressurization of the first friction device (hereinafter referred to occasionally as the first friction clutch) and an unthrottled supply of fluid to the second friction device (referred to occasionally hereinafter as the second clutch) as long as the first shifting clutch is drained at the beginning of the shifting process (e.g. for shifting from first to second speed) and when shift is to be effected from a position in which the first friction clutch is already engaged to a new speed (for downshifting from third to second speed) when a throttled hydraulic supply to the second clutch is desired, thereby ensuring a jolt-free shift change.

This ensures, while maintaining a smooth shifting (even when the second clutch is actuated while the first clutch has previously been actuated), a uniform loading of both clutches on parallel actuation.

According to another feature of the invention, the throttle-containing passage includes a check valve provided with the throttle-opening for draining of the second clutch. This ensures a rapid draining thereof in spite of the presence of the throttle.

BRIEF DESCRIPTION OF THE DRAWING

The sole FIGURE of the drawing is a hydraulic control system diagram showing only the position of the control system which are modified from the system illustrated in FIGS. 1 and 2 of U.S. Pat. No. 3,938,410.

SPECIFIC DESCRIPTION

The control system illustrated in the drawing is a portion of a hydraulic control for an automatic load-shiftable transmission having three forward speeds and one reverse speed controlled by five friction clutches or brakes (see FIG. 3 of the latter patent). It is irrelevant for the purpose of this invention whether the hydraulic control friction device is a friction clutch or friction brake and hence, these designations may be used interchangeably.

The drawing shows a 1-2 shift valve 20 and a 2-3 shift valve 40, both in their positions corresponding to second speed, a first control valve 60 with a damper 70 for a first friction device C which operates via a free-running clutch (see FIG. 3 of U.S. Pat No. 3,938,410), a second control valve 80 and a damper 90 separate therefrom for the second friction device C' which, in the second speed of the transmission, connects the same transmission parts as clutch C but without a free-running clutch. In third speed, the clutch C remains actuated while clutch C' is drained and a further clutch, not shown in the drawing here, but illustrated in FIG. 3 of U.S. Pat. No. 3,938,410, is actuated.

The construction and function of the hydraulic control system will first be described in conjunction with a shift from first speed to second speed, i.e. a 1-2 shift.

From a high-pressure source not shown, the fluid is supplied via conduit 10, annular compartments 21 and 22 of the 1-2 shift valve (spool valve) 20 to the line 23 which feeds the first control valve 60. In this position, the valve slider or spool 61 permits free filling of the first hydraulic feeder line 62 communicating with the first clutch C.

The valve spool 60 cooperates with the attached damper 70 of the clutch C so that, as the pressure in clutch C builds up, this pressure shifts the damper piston 71 to the left. In a first phase of the filling of the clutch only a spring 72 acts upon the valve spool 61 and only in the next phase is a direct abutment formed at 73 between the piston 71 and the valve spool 61.

Immediately following the incipient filling, during the 1-2 shift, the valve spool 61 is in the position illustrated in the drawing so that the fluid medium flows unimpeded into line 62 and rapidly fills the clutch C.

A direct passage 64a and a throttle-containing passage 65 are connected in parallel to the line 62 via the 2-3 shift valve 40 and a line 64. The 2-3 shift valve, in the first and second speed positions, permits unimpeded flow to the passages 64a and 65.

The passages 64a and 65 lead to separate ports of the second control valve (coupling valve) 80 and the throttle-containing passage 65 includes a check valve 81 preventing flow from line 64 except through the orifice 83 in the throttle disk 82 which simultaneously forms the check-valve member. The check valve 81, however, opens in the opposite direction, i.e. to rapidly drain fluid into line 64.

Simultaneously with the supply fluid to clutch C, the fluid passes via line 64 and passage 64a to the second control valve 80 which has its spool 85 in the position illustrated in the drawing corresponding to first speed. The fluid is thus communicated unimpeded to a second hydraulic feeder line 84 communicating with the clutch C' so that the latter is filled simultaneously with the clutch C. The throttle-containing passage is closed in the first speed position of valve 80.

The valve slider or spool 85 of valve 80 is biased to the left by hydraulic-fluid pressure applied to its end face 86 from a line 74 communicating with the clutch C and the damper 70. Thus the spool 85 is biased to the left by the pressure in clutch C. Bias in the opposite direction is afforded by a restoring spring acting upon the end face 87, 87a of the spool 85 and by load-dependent modulated pressure (throttle pressure) supplied by a line 11 and effective against the face 87, 87a.

As long as the clutch pressure delivered by line 74 from the clutch C lies below a predetermined but load-dependent threshold the second control valve 80 remains in its illustrated first-speed position in which both clutches C and C' are simultaneously filled with unimpeded unthrottled flow of fluid.

With increasing counterpressure in the clutch C, the piston 71 is shifted into engagement with abutment 73 and ensures a reduced rate of pressure buildup in clutch C (as has been disclosed in U.S. Pat. No. 3,938,410) and, via the unthrottled connection path 64, 64a, 84 also in clutch C' essentially simultaneously with the engagement of the damper piston 71 with the abutment 73 of the valve slider or spool 61. The pressure in clutch C, as a result of a corresponding dimensioning of the forces corresponding to the control pressure and restoring spring 88, applied via line 74 to the end face 86 of the spool 65 overcomes the effect of the restoring spring 88 and the throttle pressure delivered by line 11 to block line 64a at its port of valve 80 and connects the throttle-containing passage to line 84 as the threshold is reached or exceeded. At this point in time, the engagement phase (slip phase) of both clutches C and C' has already ended. The remainder of the pressure buildup in both clutches has no effect on the quality of the shift change. The pressure built up in both clutches C and C' is identical during the slip phase because they are supplied in common by unthrottled fluid line 62, 64, 64a, 84 from the first control valve 60 from the inception from the shift change.

The hydraulic control arrangement will be further described below in conjunction with the downshifting from the third speed to the second speed.

In the third speed, the 1-2 shift valve 20 is in its illustrated position while the valve spool or slider of the 2-3 shift valve 40 is in its right-hand position, i.e. the opposite extreme position, so that the section 64a of the feed line is cut-off from line 64 and is connected to drain.

The second clutch C' is thereupon drained while the clutch C (together with a further unillustrated clutch) is supplied with fluid through 1-2 shift valve and line 23. Because the full clutch pressure is applied to clutch C and prevails in the damper 70, this pressure is applied via line 70 to the spool 85 to shift the latter into its opposite extreme position from that illustrated, i.e. to the left. In this position, the port of passage 64a at the valve 80 is blocked but the throttle passage 65 is connected to the feeder line 84.

When, during down-shifting from third speed to second speed, the 2-3 shift valve is actuated, the hydraulic fluid passes via the throttle 83 into line 84 to first fill the clutch C' and then, as the pressure in the clutch C' rises to a predetermined value defined by the spring 91, into the damper 90 which functions as a simple pressure accumulator whose spring 91 has a fixed seat. By a corresponding dimensioning of the throttle orifice 83 the filling of the damper 90 takes place over a predetermined time period so that the actuation of the clutch C' is effected in a jolt-free manner.

A draining of clutch C', for example by a down-shifting from second speed to first speed or an upshifting from second speed to third speed results in opening of the check valve 81 so that the draining is as rapid as possible.

I claim:
1. In a hydraulic control system for a multispeed transmission shiftable under load and having two friction devices hydraulically actuatable concurrently in a predetermined speed condition of the transmission through a 2-3 shift valve, a first of said friction devices remaining actuated in a neighboring speed condition and being connected to a first control valve having a valve slider which acts against a spring in a first phase of pressure build-up in said first friction device and acted upon by a direct abutment formed by a piston of a first damper connected to the first friction device, a second control valve connected to a second of said friction devices and to a second damper having a piston acting upon a restoring spring with a fixed seat, and wherein the hydraulic lines to both said friction devices are connected in the concurrently actuated state there of, the improvement wherein:
   in said predetermined speed condition of the transmission with concurrent actuation of said first and second friction devices, a first hydraulic line feeding the first friction device is connected by the 2-3 shift valve to a direct passage and to a throttle-con- taining passage communicating via the second control valve selectively with a second hydraulic line feeding the second friction device; and the second control valve has a slider to one end surface of which is applied the pressure of the first friction device while a restoring spring bears in the opposite direction upon said slider of said second control valve so that at a pressure in the first friction device below a threshold value said second control valve connects said direct passage to said second hydraulic line and blocks the throttle-containing passage and upon the pressure in said first friction drive attaining said threshold value, said second control valve blocking said direct passage and connecting said throttle-containing passage to said second hydraulic line.

2. The improvement defined in claim 1 wherein said first damper and said spring of said second control valve are dimensioned such that said second valve connects said throttle-containing passage to said second hydraulic line substantially upon direct abutment between said piston of said first damper and said slider of said first control valve.

3. The improvement defined in claim 2, further comprising means for applying load-modulated pressure to said slider of said second valve in a direction identical to that in which said restoring spring of said second valve is effective thereon.

4. The improvement defined in claim 3 wherein said throttle-containing passage is provided with a check valve opening upon the draining of said second hydraulic line to discharge fluid unimpeded therefrom.

* * * * *